Fig. 1.

INVENTOR.
Donald E. Stark

United States Patent Office 3,096,138
Patented July 2, 1963

3,096,138
PROGRAMMING CONTROL CIRCUITS
Donald E. Stark, Eastwood, Pa., assignor to Westinghouse Air Brake Company, Wilmerding, Pa., a corporation of Pennsylvania
Filed Dec. 12, 1958, Ser. No. 780,019
4 Claims. (Cl. 346—34)

My invention pertains to programming control circuits. More particularly, my invention pertains to a control circuit arrangement for programming the read-out sequence from indication storage units into a recording device such as an electric typewriter.

In the materials transportation industry, particularly in relation to pipeline transportation, remote control systems have made possible the automatic control of the intermediate pumping, diversion, and storage stations of and entire system from a single central control location. These remote control systems not only provide remote control of such stations but also provide indications at the master control station of the necessary data from the stations by which the operation of the system may be ascertained and recorded. For example, in one type of system used for station control, the indication data from the various stations is transmitted in code form over the remote control system and is stored in visual indicators at the central control location. In whatever form the received data is displayed, it permits the system operator to determine the actual functioning of the various stations and to plan guture operations. To provide even more efficient operation of the system, indication data in most installations is logged at periodic intervals to provide a permanent record of the functioning of the system. Such data logging may be accomplished manually. However, this operation is time consuming in a large system and frequently requires the full time of one or more operators. In any such system, the reduction of the manpower required for control purposes is always an improvement in the economy and efficiency of system operation.

Thus, means for automatically logging the received data is desirable and provides distinct operating advantages. Such records must be in a permanent form to provide a continuous record of system operation. One such form is data log sheets prepared by electric typewriters. Also, for proper logging of the received data in large systems with many remote stations, the data read out from the storage indicators must be sequenced so that the data will appear in readable form and in a predetermined order. For full automation of the read-out process, the requirements for manual operation by the system operator must be completely eliminated except possibly for the initiation of the typing program. These requirements develop a need for a program control of the data read-out into the permanent recording device. This control must sequentially step through the various items of the indicated information. The system must also be self-checking and must provide for the absence of data from a particular station or for incorrect data, and, in such event, must proceed with the completion of the remainder of the program.

It is therefore an object of my invention to provide an improved programming control means for recording system data stored in indicators.

Another object of my invention is provide an improved programming circuit arrangement to control the recording of data in a remote control system.

A further object of my invention is to provide programming control for periodically recording in a permanent form the data stored in indicator devices of a control system.

Still another object of my invention is to provide control circuits for programming the read-out of stored data into an electric typewriter for recording purposes.

A further object of my invention is to provide a programming control circuit arrangement for the recording of multiple data by an electric typewriter or similar apparatus.

It is also an object of my invention to provide a program circuit arrangement to control the recording of data from various remote stations into an electric typewriter for the preparing of a permanent record of system operation.

A further object of my invention is to provide, in conjunction with a remote control system, an improved programming control arrangement using crossbar type switches to control the readout of data received from remote stations of the control system into an electric typewriter to prepare a permanent record of system operation.

Other objects, features and advantages of my invention will become apparent as the specification progresses when taken in connection with the accompanying drawings.

Referring now to the drawings, the four major parts thereof, when taken together, illustrate a programming circuit arrangement for an electric typewriter which embodies one form of the control circuits of my invention and in which.

Figure 6:
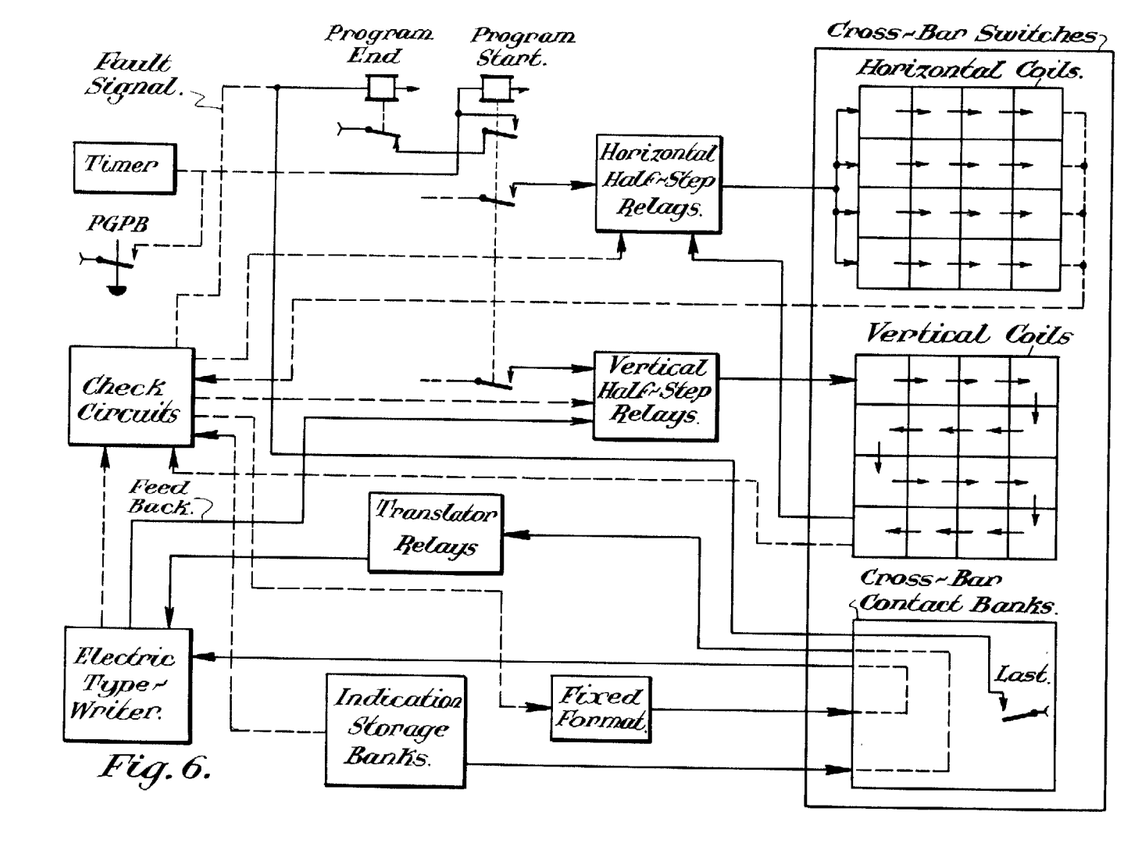
FIG. 6 is a conventional block diagram and function flow chart for the programming system embodying my invention.

In practicing my invention, the conventional and well-known functions of any standard remote control system are extended beyond the storage, at the control location, of the indications of system operation received from the various stations. During the following brief, general description of the system of my invention, reference to the block diagram and flow chart of FIG. 6 will aid in an understanding of the discussion. The remote control system to which my invention is added includes indication devices to store the received data in code form. These indication devices may be relay banks which provide only for storage of the coded data. In other systems, visual indicators are used which not only store the received data but display it visibly in a form readily intelligible to the system operator. Whatever type indicators are used, a common feature is the provision of contacts to control read-out of the stored data into some form of recording apparatus. At this point, the system of my invention adds a crossbar type switch or switches, such as used in the telephone art, to the office apparatus of the remote control system. One or more such crossbar switches are added in accordance with the number of items for which the data is to be recorded. In other words, the crossbar switch arrangement must have the capacity for handling the total number of code digits for all of the items of information stored in the system. The horizontal coils of each crossbar switch are connected in a series chain with the resulting chains of the various switches operating in multiple. The vertical coils are controlled in a series chain arrangement cascaded through all of the switches in use for the particular system. The stepping of the horizontal and vertical coil chains is controlled by a pair of half step relays for each chain. The vertical half-step relays are actuated by a feedback pulse from the typewriter during each typing period. The horizontal half-step relays are actuated at the start of a program and thereafter at the end of each vertical chain sequence.

The multi-deck crosspoint contacts of the crossbar switches are then arranged to sequentially connect contacts of the various indication devices, in which the data quantities are stored in code form, to a translation means which converts the data into proper form for entry into the recording device, here shown as an electric typewriter, for permanent recording. As shown specifically, the translator is a relay bank with one relay for each unit of the code form by which each digit of the stored quantities is represented. The contacts of these translator relays form a matrix which converts the data code into the proper form for controlling the solenoids of the electric typewriter. The single translator relay bank is reused to sequentially convert the stored code form for all digits of each stored quantity. In addition, certain fixed format characters related to the recorded information are also selected at the proper time by the crosspoint contacts of the crossbar switches and fed directly to the typewriter solenoids to complete the desired record.

The circuit arrangement includes certain check circuits to guarantee that only one set of crosspoint contacts is operated before the typing proceeds for each digit or fixed character. These check circuits coordinate the advance of the horizontal and vertical coil chains of the crossbar switches through the half-step relay pairs. This arrangement also checks the proper operation of the electric typewriter so that if the unit fails to type a particular item, the program cycle is interrupted until the proper operation of the system can be restored. The system further includes interlock circuits to integrate the programmer cycle with the operation of the remote control system. For example, the reception of an indication code from any station delays the advance of the programming cycle through the portion relating to that station until the new data is recorded in the indication devices. At the same time, the lack of data from a particular station or improper data results in the substitution of a preselected character in the printed form indicating that the stored data was in error. The typing program, once initiated, thus continues, barring an actual failure or fault condition, in sequence through the various items of stored data, entering each item in proper order into the electric typewriter for permanent recording. The programmer also inserts such fixed format into the sequence as is required by the particular system in order that the recorded data may be properly understood and interpreted.

I shall now describe the details and operation of the programmer circuits embodying the one form of my invention. I shall then point out the novel features thereof in the appended claims.

Figure 2:
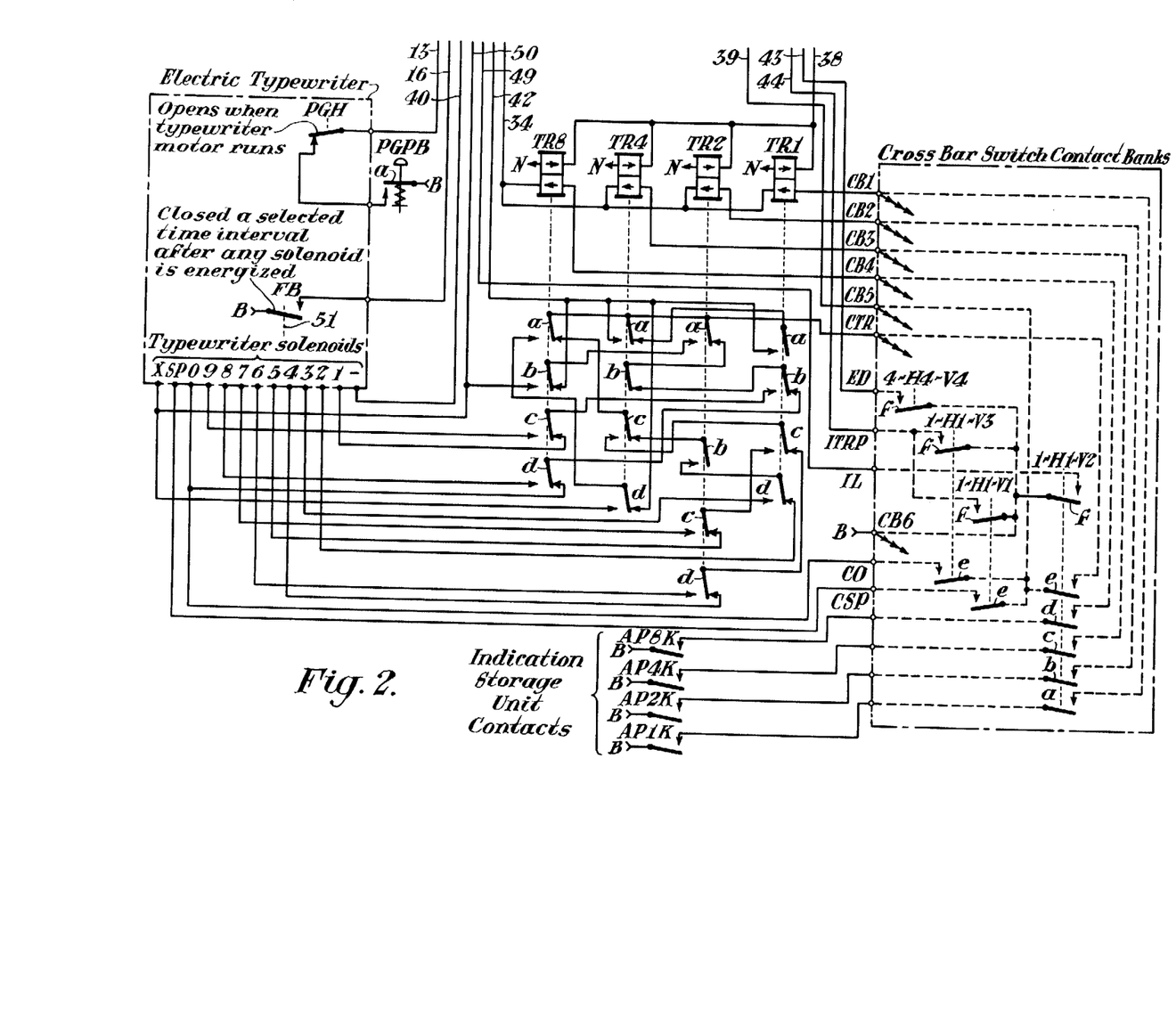
FIG. 2 shows typical read-out circuits from the data indicators and conventional representations of the crossbar switch contact banks and the input circuits to the electric typewriter.
Figure 3:
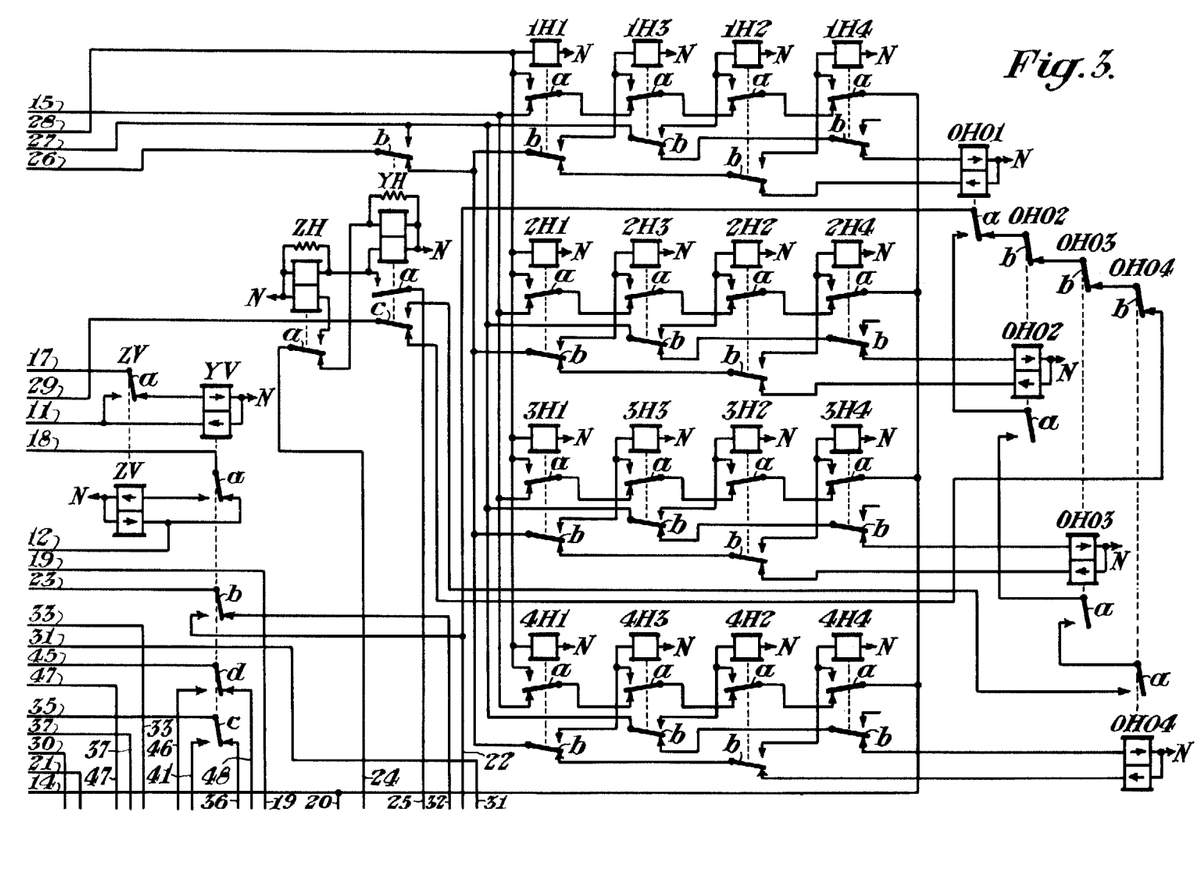
FIG. 3 is a diagrammatic illustration of the control circuits for the horizontal coils of the crossbar switches.
Figures 4, 5:
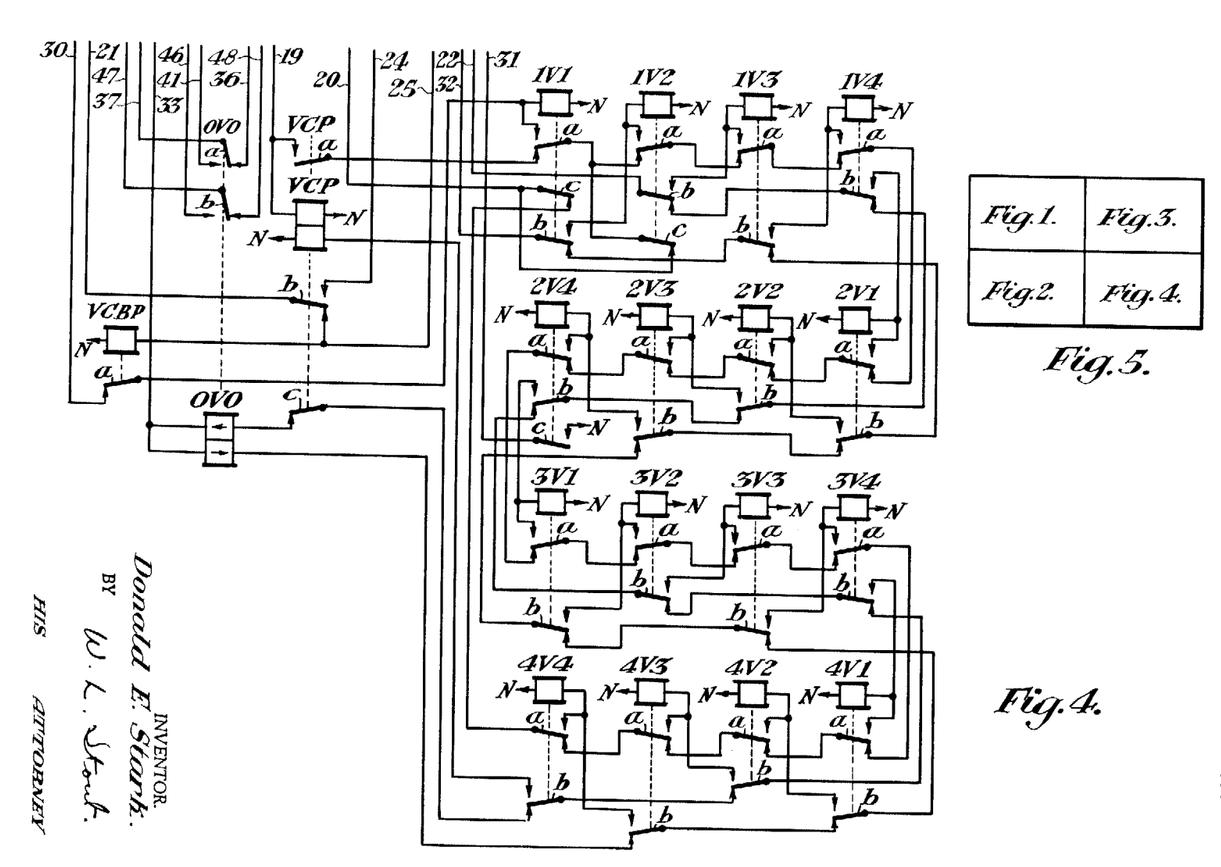
FIG. 4 illustrates a control circuit arrangement, in diagrammatic form, for the vertical coils of the crossbar switches which is also part of the programmer control circuits embodying my invention.
FIG. 5 is the assembly diagram for FIGS. 1 to 4 in order to show a complete programming system.

Referring again to the drawings, FIGS. 1, 2, 3, and 4 thereof, when assembled together, as shown in FIG. 5 with similarly referenced connecting wires matching, show, partly in detail and partly by conventional form, typewriter programming control circuits including crossbar switches for recording the data received at the control location of a remote control system from the remotely controlled stations and stored in some form of indication devices.

In the drawings, certain circuit conventions are used to simplify the showing and increase the understanding of the system. The entire apparatus is furnished with a local source of direct current energy which may be assumed to be a battery having a proper size and capacity for the system. However, for the sake of simplicity and since the use of such is conventional, the battery is not shown in the drawings but only the positive and negative terminals thereof are indicated by the reference characters B and N, respectively. It is to be understood that, in any actual installation, it may be necessary to have separate sources of direct current energy in order to supply different voltages for different parts of the apparatus. In addition, it is also possible that different sources other than batteries may be used to supply this energy. However, it is not necessary for an understanding of my invention to shown or consider the different types of sources and the different voltage levels.

The illustrated system includes certain slow-acting relays. These may be of slow-release or slow-pickup characteristics. In the former, the slow-release characteristic enables the relay to retain its front contacts closed for a selected time interval after the relay winding is deenergized. In slow-pickup relays, front contacts remain open for a selected time interval after the relay winding is energized. These relays are indicated by vertical arrows drawn through the movable portion of the relay contacts, the arrow pointing downward or upward as the relay is designated as slow-release or slow-pickup, respectively. Certain of the ordinary acting relays are shown with their windings snubbed by resistors connected in multiple with the winding. While this provides a certain degree of retardation in the release of the relay contacts, such relays are not considered to be slow release and are thus not so indicated.

Other relays of the system are of the magnetic stick type. These are designated by an arrow shown within the symbol for each relay winding and by showing the contacts of such relays in a vertical plane. It is characteristic of magnetic stick relays that the relay operates to move its contact armatures to close the normal or left-hand contacts as illustrated in the drawings, when the flow of current through any relay winding is in the direction of the arrow shown therein. When the flow of current through the relay winding is in the direction opposite to the arrow, the relay contacts are operated to close in the right-hand or reverse positions. When the windings of such relays are deenergized, the contacts remain in the position to which they were last operated. The translator relays TR shown in FIG. 2 are examples of such magnetic stick relays. Where biased relays are used, they are indicated also by an arrow shown within each of the relay windings, but the contact structure of such relays is shown in the conventional horizontal plane so that such relays may thus be distinguished from the magnetic stick type just discussed. These biased relays operate to close front contacts only when the flow of current through the relay winding is in the direction of the arrow shown therein. When the flow of current is in the opposite direction, or when the relay is deenergized, the contact armatures are released to close back contacts. For all relays, except the magnetic stick type, the movable contact armatures as shown are in their lower position if released, and in the upper position if picked up regardless of the location of the contact relative to its control winding. In other words, whether the contact associated with a relay appears above or below the symbol for the relay winding in the drawings, the lower fixed contacts are back contacts and the upper fixed contacts are front contacts.

In order to illustrate the system of my invention, I have shown, in FIGS. 3 and 4, four crossbar switches by which the program sequence is established. Each of the four switches is illustrated as having four horizontal coils shown in FIG. 3 and four vertical coils shown in FIG. 4. For example, the upper row of windings shown in FIG. 3 have been designated as coils 1H1, 1H3, 1H2 and 1H4 and are the four horizontal coils for the No. 1 crossbar switch. Similarly, the vertical coils for the same switch are shown in the upper row in FIG. 4 and are designated respectively, by the references 1V1, 1V2, 1V3 and 1V4. The horizontal and vertical coils for the No. 2, 3, and 4 cross bar switches are similarly shown and designated in the second, third, and fourth rows, respectively, in FIGS. 3 and 4. It is to be understood, of course, that the crossbar switches used may be of various sizes in order to provide sufficient sets of crosspoint contacts for sequencing all of the data involved in a particular control system. The size shown is assumed, for purposes of the present description, to be sufficient to handle the system here contemplated and more particularly is sufficient to illustrate the arrangement and form of my invention. The principles of controlling the crossbar switches are the same whether a single switch or several switches are used, whether or not each switch is provided with an equal number of horizontal and vertical coils, and for any number of coils. Various sizes are available in the art and the use of any size and any number is contemplated by the form of my invention.

In addition, each switch here used is assumed to have six decks or banks of crosspoint contacts. In other words, for each pair of operated coils, that is, one horizontal and one vertical coil, a set of six crosspoint contacts is closed in the contact banks. Some of these crosspoint contacts are shown in the lower right portion of FIG. 2 enclosed in a conventional dot-dash rectangle which represents the contact banks of the crossbar switches shown in FIGS. 3 and 4. The terminals CB1, CB2, CB3, CB4, CB5 and CB6 represent the common terminals for each of the contact decks or banks 1 through 6, respectively. The contact sets themselves are designated by composite reference characters which illustrate, in order, the particular switch of which the contact set is a part and the horizontal and vertical coils of that switch which control that particular set of contacts. For example, in the extreme lower right of the conventional rectangle illustrating the contact banks are shown in column six crosspoint contacts which are designated by the common reference character 1–H1–V2. This indicates that these particular contacts are a set which is part of No. 1 crossbar switch and controlled respectively by the first horizontal coil 1H1 and the second vertical coil 1V2. This set of crosspoint contacts illustrates all six possible contacts, one in each contact bank, for the particular control windings here designated. It is believed that the reference characters designating other sets of crosspoint contacts may be understood from this single example and will not be further discussed at this time.

Each of the terminals CB1 to CB6, inclusive, as well as one or more of the other terminals of the crossbar switch contact banks have connected thereto a conventional symbol which designates that such terminals are the point of multiple connections which are carried through various crosspoint contacts of the crossbar switches. The few connections shown within the contact banks are illustrated conventionally by dotted lines to designate that these are but typical examples of the many possible connections which can be made. It is to be understood, however, that the various contacts shown under the horizontal and vertical coils in FIGS. 3 and 4 are not part of the crosspoint contact banks but are independent contacts controlled by the individual coils themselves in the same manner that contacts are controlled by a single relay. Thus, the front and back contacts shown in FIGS. 3 and 4 are closed as the corresponding horizontal or vertical winding is energized or deenergized, respectively. The crosspoint contacts illustrated in the banks of FIG. 2 are, of course, closed only when both of the designated pair of coils, that is, one horizontal and one vertical coil, are simultaneously energized during the crossbar switch operation.

All of the apparatus in the illustrated system embodying my invention is shown in its normal at-rest condition. At this time, all of the crossbar coils and all of the relays, with the exception of vertical half-step relays YV and ZV (FIG. 3) and the second emergency timer relay ETMB (FIG. 1), are deenergized. Each lower winding of these half-step relays is energized over a back contact of the program start relay PGST shown in FIG. 1. The circuit for the lower winding of relay YV includes back contact b of relay PGST and wire 11, while the circuit for the lower winding of relay ZV includes back contact c of relay PGST and wire 12. In each lower winding, the flow of current in the traced circuit is in the direction opposite to the arrow shown within the winding symbol. Thus, each of these relays, being of the magnetic stick type, operates its contacts to close in their right-hand or reverse positions, in which position they are illustrated in the drawings. Relay ETMB is energized during at-rest conditions by an obvious circuit over back contact f of relay PGST.

Relay PGST is energized at the beginning of a programming cycle. However, its energization is preceded by the energization of two other relays of the system, the program relay PG and the holdtime relay HT. Relay PG is the first relay of the apparatus energized when a program is initiated. The circuit for this relay is traced from terminal B over normally open contact a of program push button PGPB (FIG. 2), a contact PGH within the electric typewriter unit, wire 13, back contact d of relay PGST, and the upper winding of relay PG to terminal N. Push button PGPB is illustrated as a manually operated unit which the system operator actuates to close its single contact a to initiate the programming cycle. However, it is to be understood that, in addition to this push button, an automatic program initiation arrangement may be used which is controlled periodically by a clock mechanism to start the data recording cycle. The system may be further provided with an arrangement which will automatically initiate a typing cycle if a change in particular items of information is received from the stations or if any received change exceeds a preselected amount. For purposes of the present descrption, however, the single means of initiating the typing cycle is shown as sufficient for an understanding of my invention. The program hold contact PGH, shown conventionally within the typewriter unit, prevents the initiation of a program cycle if the typewriter is operating. This is of particular importance if automatic program starting is used to avoid interference and improper entries during a period when the operator is manually typing special entries.

When relay PG picks up, the closing of its front contact b completes an obvious energizing circuit for relay HT which immediately picks up. With front contact c of relay PG and front contact b of relay HT closed, a circuit is completed for energizing relay PGST which picks up at this time, closing its front contact a to complete its stick circuit which further includes back contact a of the program end relay PGE. This latter relay will be discussed in detail as to its control and operation later in the description. The closing of front contact b of relay PGST completes stick circuits for relays PG and HT. The circuit for this latter relay further includes front contact a and the winding of relay HT in addition to a resistor 53, the purpose of which will be described shortly. The stick circuit for relay PG includes, in addition to front contact b of relay PGST, wire 14, four multiple paths each including, in series, back contacts a of the horizontal coils of a single crossbar switch, and thence over wire 15, front contact a and the lower winding of relay PG to terminal N. The opening of back contact d of relay PGST obviously interrupts the initial energizing circuit for relay PG. Thus when any set of corresponding horizontal coils of all of the crossbar switches is energized, the stick circuit for relay PG is interrupted. This relay thus releases as soon as the crossbar switch becomes active in the manner to appear shortly.

Relay HT is also provided with a shunting circuit which extends from the right-hand terminal of resistor 53 over wire 31 to terminal N at front contact c of vertical coil 2V4 of the No. 2 crossbar switch (shown in FIG. 4).

When front contact c of coil 2V4 closes, a shunt is completed on the winding of relay HT and this relay will release, opening its own front contact a to interrupt the stick circuit. As will appear hereinafter, this shunt circuit may be completed at any point in the operation of the crossbar switches. It is here illustrated as occurring on the eighth step in the first cycle of operation of the vertical coils which are connected, as will appear later, in cascade. The purpose of this shunt circuit will be described later during the operational description of the system.

The opening of back contacts b and c of relay PGST interrupts the circuits by which relays YV and ZV are held in their reverse positions. The closing of front contact c of relay PGST prepares the circuit arrangement for operating relays YV and ZV in half-step operation. These circuits are further completed over front and back contacts b of the typewriter feedback relay TWFB. Relay TWB is normally operated, during each typing interval, by a circuit completed from terminal B over normally open contact FB within the electric typewriter unit, this contact being closed a selected time interval after any typewriter solenoid is energized, wire 16, and the winding of relay TWFB to terminal N. However during the starting cycle, this relay is energized by a circuit including front contact e of relay PGST and front contact d of relay PG. Relay TWFB is provided with a stick circuit, effective at times, which includes its own front contact a, front contact e of relay PGST, and, in multiple, back contact a of the first emergency timer relay ETMA, front contact a of translator repeater relay TRP, and front contact a of lock stick repeater relay LSP. This stick circuit will be more fully discussed hereinafter.

Returning to the operation of the vertical half-step relays, the closing of front contact c of relay PGST is followed shortly by the closing of front contact b of relay TWFB, described above, which completes the circuit through the upper winding of relay YV also including wire 17 and reverse contact a of relay ZV. It is obvious that the flow of current in the upper winding of relay YV is in the direction to cause the relay to close its normal contacts. Relay TWFB is periodically energized and deenergized during typing operations. Initially, however, it is deenergized when relay PG releases and opens its front contact d, the stick circuit arrangement being open at this time. When it first releases to close its back contact b, a circuit is completed from terminal B over front contact c of relay PGST, back contact b of relay TWFB, wire 18, normal contact a of relay YV, and the upper winding of relay ZV to terminal N. The direction of current flow is such as to cause relay ZV at this time to operate to close its normal contacts.

When relay TWFB is next energized, the closing of its front contact b completes a circuit over wire 17 and normal contact a of relay ZV through the lower winding of relay YV. At this time, the flow of current is opposite to the direction of the arrow shown within the lower winding and relay YV operates its contacts to close in their reverse position. The next release of relay TWFB to close its back contact b completes the circuit over wire 18 and reverse contact a of relay YV through the lower winding of relay ZV. It is obvious that the current flows in a direction opposite to the arrow through this lower winding and relay ZV operates its contacts to close in their reverse position. Thus the pair of vertical half-step relays, YV and ZV, operate during each typing period to their opposite positions, relay YV operating at some point within the typing period and relay ZV at the end thereof. It is further obvious that the contacts of relay YV thus operate once during each typing period moving alternately to close normal and reverse contacts, respectively.

A second pair of half-step relays are also part of the system of my invention, the horizontal half-step relays YH and ZH. The half-step operation of this pair of relays is controlled by the vertical chain repeater relay VCP. This relay is first energized during the initial or starting cycle of a typing program and is then deenergized as the first typing interval begins. Thereafter, it is energized upon the completion of each cycle of operation through the cascaded vertical coil chain of the four crossbar switches and is deenergized as the next vertical chain cycle begins. Initially, relay VCP is energized by a circuit from terminal B over front contact b of relay PGST, front contact e of relay PG, wire 19, and the upper winding of relay VCP to terminal N. When relay VCP picks up to close its front contact a, a stick circuit is completed which extends from front contact b of relay PGST over wire 14, wire 20, back contact c of coil 1V2, and back contact a of coil 1V1 to front contact a and the winding of relay VCP. As will be described shortly, this stick circuit is interrupted and relay VCP releases when coil 1V1 is energized and opens its back contact a. The release of relay VCP energizes its back contact repeater relay VCBP, the circuit including front contact f of relay PGST, wire 21, back contact b of relay VCP, and the winding of relay VCBP.

Relay VCP is not reenergized until the end of the first vertical coil chain cycle. At this time, the lower winding of relay VCP is energized by the circuit including front contact b of coil 4V4 and back contacts b, in series, of all other even-numbered vertical coils, wire 22, normal contact b of relay YV, wire 23, and front contact g of relay PGST. At this time, the stick circuit for relay VCP over its front contact a is the same as previously traced. This action for relay VCP repeats at the end of each cycle of the vertical coil chain of the crossbar switches.

When relay VCP picks up to close its front contact b, a circuit is completed for energizing the upper winding of relay YH. This circuit is traced from terminal B over front contact f of relay PGST, wire 21, front contact b of relay VCP, wire 24, back contact a of relay ZH and the upper winding of relay YH to terminal N. Relay YH picks up at this time closing its front contact a. When relay VCP releases shortly, it completes a stick circuit for relay YH through its lower winding and front contact a, wire 25, and back contact b of relay VCP, and thence over wire 21 and front contact f of relay PGST to terminal B. This circuit also energizes the upper winding of relay ZH, the path branching from front contact a of relay YH through the upper winding of relay ZH to terminal N. The upper winding of relay YH is snubbed by a resistor connected in multiple with the relay winding to bridge any open circuit time between the opening of the energizing circuit at front contact b of relay VCP and the completion of the stick circuit at the corresponding back contact b.

When relay VCP is next energized, the closing of its front contact b completes the stick circuit for relay ZH which includes wire 24 and front contact a and the lower winding of relay ZH. The opening of back contact b of relay VCP, however, interrupts the stick circuit for relay YH which releases at this time. When relay VCP releases shortly thereafter, the stick circuit for relay ZH is interrupted by the opening of front contact b of relay VCP and relay ZH releases. The closing of back contact b of relay VCP at this time has no effect on the half-step relays since front contact a of relay YH is already open. It is obvious that the half-step counting action of relays YH and ZH repeats as relay VCP repeats the action of the vertical coil chain of the crossbar switches. In other words, each time relay VCP is energized and then releases, relays YH and ZH alternately are energized and then deenergized so that they change positions once for each cycle of energization of the vertical coils of the cross-bar switches. Thus on successive counting cycles of the vertical coils, relay YH alternately closes front and back contacts.

The initial pickup of relay YH energizes the first horizontal coil of each crossbar switch. It is to be noted at this time that, in the operation of crossbar switches, a horizontal coil must operate prior to the operation of the vertical coils. In the present arrangement, the corresponding horizontal coil chains of the crossbar switches are connected in multiple to allow the operation, during the period of energization of each set of horizontal coils, of all the vertical coils in series cascade operation. In other words, prior to each cycle of operation through the vertical coils connected in a series chain, a new set of corresponding horizontal coils of all the crossbar switches must be energized. Thus, when relay YH first closes its front contact b, which occurs during the program starting cycle, the circuit is completed from terminal B over front contact h of relay PGST, wire 26, front contact b of relay YH, wire 27, front contact f of relay PG, wire 28, and the coils 1H1, 2H1, 3H1, and 4H1, in multiple, to terminal N. With the first horizontal coil of each crossbar switch thus energized, it is to be noted that the opening of back contacts a of these four horizontal coils interrupts the stick circuit arrangement for relay PG which releases at this time since its energizing circuit is already open at back contact d of relay PGST. The closing of front contacts a of these four horizontal coils completes stick circuits for each coil. The circuit for coil 1H1, for example, includes its own front contact a, back contacts a, in series, of coils 1H3, 1H2 and 1H4, wire 14, and front contact b of relay PGST. Stick circuits for coils 2H1, 3H1 and 4H1 are similar and may be traced as desired by reference to the drawings in connection with the above stick circuit for coil 1H1.

The first release of relay YH closes its back contact b and completes circuits for energizing the H3 coils of the various crossbar switches. For coil 1H3, for example, this circuit includes, front contact h of relay PGST, and wire 26, as before, and thence back contact b of relay YH, front contact b of coil 1H1, and coil 1H3 to terminal N. Coil 1H3 closes its front contact a to complete a stick circuit which branches from the stick circuit previously traced for relay 1H1. The opening of back contact a of coil 1H3, however, interrupts the stick circuit for coil 1H1 which shortly releases. The energizing and stick circuits for coils 2H3, 3H3 and 4H3 are similar to that described for coil 1H3 and will not be further discussed.

The operation of the horizontal coil chains continues with a one step advance for each pickup or release of relay YH. It is to be noted that the odd-numbered horizontal coils are first energized in sequence followed by the sequential operation of the even-numbered coils. In other words, considering crossbar switch No. 1, the coils are energized during chain action in the order 1H1, 1H3, 1H2 and 1H4. If larger crossbar switches were in use, a similar order would be followed with the odd-numbered coils in sequence preceding the sequence of the even-numbered coils.

In the circuit arrangement of my invention, I provide check circuits to assure that one and only one horizontal coil in each crossbar switch is operated prior to the energization of the first vertical coil to begin the next chain sequence. This is necessary since the horizontal coil must operate prior to the corresponding chain action of the vertical coils. At the same time, only one horizontal coil in each switch must be operated at a particular time in order that the crosspoint contacts will close in sequence one set at a time. Thus, for each crossbar switch, a one-horizontal-only check relay is provided, the relays OHO1, OHO2, OHO3 and OHO4 for the four crossbar switches, respectively. These relays are all of the magnetic stick type so that they hold their contacts closed in the position to which they are at last operated when the relays are deenergized. During the initial or starting sequence, each of these relays is first energized through its lower winding to assure that it occupies its reverse position. For example, a circuit for relay OHO1 may be traced from terminal B at front contact h of relay PGST over wire 26, back contact b of relay YH, back contacts b of coils 1H1 and 1H2, and the lower winding of relay OHO1 to terminal N. Since the flow of current is obviously opposite to the direction of the arrow within this lower winding, the relay operates to its reverse position closing reverse contacts, if not already in that position. Similar paths in multiple may be traced through back contacts b of horizontal coils H1 and H2 of the other crossbar switches to similarly energize the lower windings of relays OHO2, OHO3 and OHO4. This operation checks the initial position of all horizontal coils in their deenergized condition.

When relay YH picks up to energize the first horizontal coil, the OHO relays are driven to their normal position, the circuits for relay OHO1 including front contact h of relay PGST and wire 26, and thence front contact b of relay YH, back contacts b of coils 1H3 and 1H4, and the upper winding of relay OHO1. Similar circuits may be traced for the other check relays through corresponding contacts of the horizontal coils of the respective switches. In each relay, the flow of current through the upper winding is in the direction of the arrow and the relay operates to close its normal contacts. This operation and resulting position of the OHO relays checks that relay YH is picked up and that only the H1 coil of each switch is operated. That is, a check is made that the H3 coils are still deenergized and their contacts released. When relay YH releases to energize the H3 coils, as previously described, the OHO relays are eventually energized through their lower windings to operate their contacts to close in the reverse position. This action occurs when coils H1 are deenergized and release to close their back contacts b, thus completing the circuits originally traced for the lower windings of relays OHO. At this time, the positioning of relays OHO in their reverse position checks that coils H1 have all released and that only the H3 coils are energized as a result of the release of relay YH, since coils H2 must remain released for the circuits for relays OHO to be complete.

The circuit for energizing the first vertical coil of No. 1 crossbar switch, to initiate the sequential chain operation, checks the agreement between the positions of relay YH and relays OHO. This agreement results only if the preceding H coil which was deenergized by the change in position of relay YH, drops out to complete its proper operation. In other words, the circuit checks that only one set of H coils are energized and their respective armatures operated to close front contacts. Thus, for the initial operation, the circuit for coil 1V1 may be traced from terminal B at front contact g of relay PGST over wire 23, normal contact b of relay YV, normal contacts a, in series, of relays OHO1, OHO2, OHO3 and OHO4, front contact c of relay YH, wire 29, back contact g of relay PG, wire 30, back contact a of relay VCBP, and coil 1V1 to terminal N. During the second cycle of operation of the vertical chain, the circuit traced above will branch over reverse contact a of relay OHO1, reverse contacts b, in series, of relays OHO2, OHO3 and OHO4, back contact c of relay YH, and thence as previously traced to coil 1V1. Each of these circuits checks the agreement between the position of relay YH and the position of relays OHO which, respectively, must be picked up and normal for the first cycle and released and reversed for the second cycle. When coil 1V1 closes front contacts, a stick circuit is completed including front contact b of relay PGST, wires 14 and 20, back contact c of coil 1V2, and front contact a of coil 1V1.

Once the cycle of operation through the vertical coil chain has started, the agreement check through the contacts of relay YH and relays OHO is eliminated from the control circuits for the vertical coils. For example, the circuit for coil 1V2 may be traced from terminal B over front contact g of relay PGST, wire 23, reverse contact b of relay YV, wire 32, front contact b of coil 1V1, and coil 1V2 to terminal N. The opening of back contact c of coil 1V2 interrupts the stick circuit for coil 1V1 which releases. With front contact a of coil 1V2 closed, the closing of back contact c of coil 1V1 completes the stick circuit for coil 1V2 which further includes back contacts a, in series, of the succeeding vertical coils of all the crossbar switches, wires 20 and 14, and front contact b of relay PGST. On the next succeeding step, the circuit for coil 1V3 is carried over normal contact b of relay YV, wire 22, front contact b of coil 1V2, and coil 1V3 to terminal N. This coil closes its front contact a to complete a stick circuit which includes back contacts a of the succeeding vertical coils and thence as traced for coil 1V2 to front contact b of relay PGST. The opening of back contact a of coil 1V3 interrupts the stick circuit for coil 1V2 which releases at this time.

The counting cycle through the vertical coil chain continues in this manner until it reaches the final coil of the No. 1 crossbar switch. It then cascades in a similar manner to the first vertical coil of the No. 2 crossbar switch, coil 2V1. The circuit for this coil is completed over front contact b of coil 1V4 in a manner which is obvious from an inspection of the drawings when taken in connection with the previous discussion. Coil 2V1 completes its stick circuit at its own front contact a and interrupts the stick circuit for coil 1V4 at the corresponding back contact a. The chain action then continues, cascading from the coils of switch 2 to switch 3, then to switch 4 in a similar manner. In the circuits here used to illustrate my invention, the final vertical coil 4V4 is energized at the end of the chain action for each cycle of operation. Then upon the operation of relay YV to its opposite position, the vertical chain action repeats its cycle of operation in a manner already indicated above.

The vertical coil chain is also provided with a check relay to assure that one vertical coil only is operated at a time. This one-vertical-only check relay OVO, of the magnetic stick type, operates alternately between its normal and reverse positions to accomplish this checking action. On the first step of the vertical chain action, the circuit for the upper winding of relay OVO extends from terminal B at front contact g of relay PGST over wire 23, normal contact b of relay YV, wire 22, back contacts b, in series, of the even-numbered vertical coils of all crossbar switches, back contact c of relay VCP, the upper winding of relay OVO, wire 33, and back contacts b in series, of relays TRP and LSP to terminal N. The closed position of back contact c of relay VCP assures that vertical coil 1V1 is energized and has picked up its contacts since the stick circuit for relay VCP checks back contact a of this vertical coil. Back contact b of vertical coil 1V2 assures that the next coil in the chain has not been energized. The back contacts of relays TRP and LSP, one of which is open during each typing interval, prevent any operation of relay OVO during the latter portion of a typing period after the corresponding vertical coil has operated. The flow of current through the upper winding of relay OVO is in the direction of the arrow and thus normal contacts of relay OVO are closed corresponding to the closed normal contacts of relay YV. The same circuit exists during the energized period of each odd-numbered vertical coil and checks the preceding even-numbered vertical coil released and the succeeding coil not yet energized.

When the vertical chain steps to its second position, the circuit is transferred over reverse contact b of relay YV, wire 32, back contacts b, in series, of all the odd-numbered vertical coils of the crossbar switches, and the lower winding of relay OVO to wire 33 and thence to terminal N as previously traced. This circuit is not completed until coil 1V1, deenergized when back contact c at coil 1V2 opens, releases to close its back contact b. The circuit thus checks that only coil 1V2 is picked up. It is obvious that the flow of current through the lower winding of relay OVO is in a direction opposite to the arrow shown within that winding and this relay operates its contacts to their reverse position which corresponds to the reverse position of relay YV at this time for energizing vertical coil 1V2. A similar circuit for the lower winding of relay OVO exists when each even-numbered vertical coil is energized and thus checks the release of the preceding odd-numbered coil and the non-energized condition of the succeeding odd-numbered coil. In other words, the circuit checks that only one vertical coil is energized at that time. The utility of relay OVO will appear during the subsequent operational description of the system.

Referring now to FIG. 2, in the upper central portion thereof is shown a bank of translator relays TR, specifically, relays TR1, TR2, TR4 and TR8, all of the magnetic stick type. The purpose of this bank of relays is to sequentially register the data indications from the various stations as stored in the office apparatus of the remote control system. These translator relays are controlled through crosspoint contacts of the various crossbar switches by the external storage devices which form part of the remote control system. A typical bank of contacts of such a storage device is shown in the lower portion of FIG. 2 designated by the references characters AP1K, AP2K, AP4K and AP8K. These contacts are intended to illustrate the contacts of the storage device which stores and indicates a single digit of the coded data for a particular quantity received from a field station over the remote control system. This actual storage device may be of any type well known in the art, such as a relay storage bank or a visual indicator having contacts for read-out FIG. 2 designated by the reference characters AP1K, etc., shown herein, may be contacts of a bank of indication storage relays such as shown in the copending application for Letters Patent of the United States Serial No. 642,468, filed February 26, 1957, by A. P. Jackel, for Code Converters, now Patent No. 2,934,754, issued April 26, 1960. The four contacts may be, specifically, contacts of the similar designated relays shown in FIG. 1c of this prior patent and also shown in FIGS. 2 and 3 in connection with specific read-out circuits. It is to be understood, however, that other forms of indicating devices may be used with contacts similarly provided for the code read-out. In the relay bank used as a specific illustration from the prior patent, the code digit is stored in a weighted binary code form such that each of the four relays provides a particular numerical weight to the read-out. This weight is indicated by the numeral included as part of the contact reference character. For example, the upper contact AP8K, if closed, provides a numerical read-out having the weight 8, whereas the lowest contact provides the numerical weight of 1 to the code read-out. It is well known that, in accordance with the various contacts closed, the value of the read-out is the added total of the numerical weight of each closed contact.

As was previously mentioned, the translator relays are controlled in accordance with the position of the indication storage contacts through crosspoint contacts within the various crossbar switches. For example, as specifically shown as an illustration, relay TR1 may be controlled by contact AP1K over a circuit also including contact a of crosspoint contact set 1–H1–V2, and thence terminal CB1, the lower winding of relay TR1, wire 34, back contact c of relay TWFB, wire 35, reverse contact c of relay YV, wire 36, reverse contact a of relay OVO, wire 37, and front contact b of interlock stick relay LS. Contact a of the crosspoint set 1–H1–V2 is closed when horizontal coil H1 and vertical coil V2 of the No. 1 crossbar switch are simultaneously energized. A similar circuit, if contact AP1K were assigned to an odd-numbered vertical coil, includes normal contact c of relay YV, wire 41, and normal contact a of relay OVO, but is otherwise the same as traced above. These circuits for the lower winding of relay TR1 check over contacts of relay YV and OVO to assure the proper positioning of the coils of the vertical chain before registry of the stored indication can occur. These circuits are completed only if relays YV and OVO occupy corresponding positions which assures the proper operation of the vertical coil chain. Since vertical chain operation is initiated only if relay YH and relays OHO occupy corresponding positions, these indication registry circuits actually include checks on the operation of the entire crossbar switch arrangement. Similar circuits may be traced as desired for relays TR2, TR4 and TR8 over contacts $b$, $c$, and $d$ of crosspoint contact set 1–H1–V2, the typical indicator contact bank shown having been assigned to the crosspoint contact set described. The circuits for each of the translator relays are checked over the same paths traced over contact $c$ of relay YV and contact $a$ of relay OVO.

The translator relays are restored to their reverse positions which they normally occupy during the feedback pulse from the typewriter during each typing interval. This restoring circuit is traced from terminal B at front contact $c$ of relay PGST over front contact $d$ of relay TWFB, wire 38, and the upper windings of the relays TR, in multiple, to terminal N. The flow of current through each of the upper windings is in the direction opposite to the arrow and each of the relays thus operates to restore its contacts to their reverse positions in which they remain when the relay winding is deenergized.

Contacts of relays TR form a translation matrix to convert the indication in the weighted code form received from the indicator device into the proper control pattern for the electric typewriter shown at the left of FIG. 2. The typewriter is shown conventionally by a dot-dash rectangle across the bottom of which are indicated a series of terminals leading to the typewriter solenoids. Since such electric typewriters are well known in the art, no additional details are included other than those needed for an understanding of my invention. It is only necessary to understand that when positive battery terminal B is connected to one of the numbered terminals, to the terminal SP, or to the terminal X, and negative battery terminal N is connected to the common terminal designated (—), the corresponding solenoid is actuated to in turn control the printing of the corresponding character by the typewriter. Terminal SP designates the connection to the solenoid which causes the typewriter to space to the next typing position without printing. Terminal X indicates the connection to the solenoid controlling the letter X or some other conventional character such as a dash which may be used to show the lack of a proper entry at that particular location in the type format. It is to be further understood, of course, that other recording devices such as printing telegraph transmitters may be used in place of the electric typewriter for purposes of controlling further transmission of the recorded data if desired.

If the numeral 1 is momentarily registered in relays TR from the indication storage contacts AP . . . K when the assigned crosspoint contact set 1–H1–V2 is actuated, a typical circuit for entering this information into the electric typewriter may be traced from terminal B at front contact $b$ of relay ETMA over wire 39, terminal CB5 of the contact banks, contact $e$ of crosspoint set 1–H1–V2, terminal CTR of the contact banks, reverse contact $a$ of relay TR2, reverse contact $b$ of relay TR4, normal contact $b$ of relay TR1, and reverse contact $c$ of relay TR8 to terminal 1 of the electric typewriter. After extending through the typewriter solenoid, not shown, connected with terminal 1, the circuit extends from the common terminal over wire 40, front contact $c$ of translator repeater relay TRP, and back contact $e$ of relay TWFB to terminal N.

Similar circuits may be traced for other recorded numerals through the translation matrix provided by contacts of relays TR. Contact $e$ of the crosspoint set 1–H1–V2 is included to assure that energy is supplied to the typewriter only when the indication is being transferred from the indicator device to the translator relays. If an incorrect indication is registered in relays TR, a preselected symbol is typed in place of the incorrect or absent indication, such as the symbol X or a dash. For example, if relays TR8 and TR4 should be energized during the registry period which would appear to indicate the number 12, an incorrect registry, the circuit through the translation matrix is traced from terminal CTR of the contact banks over normal contact $a$ of relay TR8 and normal contact $d$ of relay TR4 to terminal X of the electric typewriter. Other conditions in the circuit would be proper for the typing of a character and thus the substitute character would be imprinted in place of the incorrect registry in the translator relays.

Translator repeater relay TRP repeats all codes registered in relays TR except the code for the numeral 0. In other words, except for this numeral 0, regardless of the code registered in relays TR and the position of their contacts, even when an incorrect code is registered, a circuit exists to energize the upper winding of relay TRP. For example, a typical circuit may be traced using the example previously discussed, that is, the registry of the numeral 1 in the translator relays TR. Beginning with terminal CTR of the crossbar switch contact banks, which is supplied with energy from terminal B at this time, as previously discussed, the circuit extends over reverse contact $a$ of relay TR4, normal contact $a$ of relay TR1, wire 42, and the upper winding of relay TRP to terminal N. If the incorrect registry including relays TR8 and TR4 operated to their normal positions occurs, the circuit for relay TRP traced from terminal CTR includes normal contact $a$ of relay TR4, wire 42, and the upper winding of relay TRP. Other circuits may be traced as desired for energizing the upper winding of relay TRP under all conditions except, as mentioned above, the registry of the numeral 0.

Under normal conditions, the closing of front contact $c$ of relay TRP provides a connection, over back contact $e$ of relay TWFB, to terminal N from the common terminal of the electric typewriter. Relay TRP controls this connection since the parallel connection over back contact $c$ of relay ETMA is normally open during typing operations. Another parallel connection over front contact $c$ of relay LSP is also normally open as will be discussed shortly hereinafter. Relay ETMA is used for emergency timing purposes and is normally energized upon the initiation of a programming cycle by the circuit traced from terminal B at front contact $c$ of relay PGST over back contact $a$ of interlock repeater relay LP and the winding of relay ETMA to terminal N. Front contact $f$ of relay TWFB is connected in parallel with back contact $a$ of relay LP to periodically energize relay ETMA during each typing interval while relay LP remains energized. Relay ETMA has slow release characteristics and, as will appear later, the slow release period is of sufficient length to enable the relay to hold its front contacts closed during periods of deenergization during the programming cycle when back contact $a$ of relay LP and front contact $f$ of relay TWFB are simultaneously open. If the typing program is delayed by the interlocking arrangements, back contact $a$ of relay LP will remain closed, or will be reclosed to hold relay ETMA energized until the typing program is resumed. Relay ETMA times the periodic energization of relay TWFB by the feedback pulses from the typewriter during normal operation of the programmer circuits. If no feedback pulse occurs, relay ETMA will release and causes the typing of a series of substitute characters such as the letter X or a dash, as will be described later. A second emergency timer relay ETMB is normally energized during at-rest conditions over back contact $f$ of relay PGST. During a programming cycle, relay ETMB is a direct repeater of relay ETMA, being held energized over front contact $a$ of the latter relay. If relay ETMA remains released for a relative long period, relay ETMB will be deenergized for a sufficient period to release. This indicates a serious fault condition which has caused a stoppage in the program. Under these conditions, the apparatus is reset to its normal at-rest condition, as will be described shortly.

If the numeral 0 is registered in the translator relays TR, repeater relay TRP is not energized. This results from the numeral 0 being here represented by all of the indication storage unit contacts open and thus none of the lower windings of the relays TR are energized. These relays, being of the magnetic stick type, hold their contacts closed in reverse positions although both windings of the relay are deenergized at this time. Under these conditions, the lock stick repeater relay LSP is energized and picks up to close its front contacts at the end of its slow acting period. The circuit for relay LSP may be traced from terminal B at front contact $i$ of relay PGST over back contact $d$ of relay TRP, the winding of relay LSP, back contact $c$ of relay TWFB, wire 35, then, depending upon the position in the vertical chain sequence, either reverse contact $c$ of relay YV, wire 36, and reverse contact $a$ of relay OVO or normal contact $c$ of relay YV, wire 41, and normal contact $a$ of relay OVO, and thence over wire 37 to terminal N at front contact $b$ of relay LS. As will appear later, this circuit is completed during each typing interval, but since relay LSP is slow acting, it is not energized under normal operation for a sufficient period prior to the opening of back contact $d$ of relay TRP to close its front contacts. However, when relay TRP is not energized due to the numeral 0 being registered in translator relays TR, relay LSP picks up. Under these conditions, the closing of front contact $c$ of relay LSP completes the connection from the common terminal of the electric typewriter to terminal N at back contact $e$ of relay TWFB.

However, when the numeral 0 is to be printed as part of a fixed format or a fixed character reference in the typing or programming sequence, relay LSP is not energized. Under these conditions, relay TRP will be energized over other circuits and pick up. It is to be noted that when the numeral 0 is registered in the translator relays, the circuit for supplying energy to terminal 0 of the electric typewriter includes reverse contacts of each of the translator relays. However, as will appear later, when the numeral is typed as part of a fixed format, energy is supplied over other circuits including selected cross-point contacts in the crossbar switches which are permanently connected to provide the fixed format. The operation of relay TRP under such conditions will be discussed during the operational description of the system.

The program end relay PGE is used to end the programming action. Under normal conditions, this relay is energized from terminal B at terminal CB6 of the crossbar switch contact banks over contact $f$ of crosspoint contact set 4–H4–V4, terminal ED of the banks, wire 43, and the winding of relay PGE to terminal N. Circuits over other crosspoint contacts completed under special conditions may also be used to terminate short typing programs including only a desired portion of the usual information. Another circuit for relay PGE includes back contact $a$ of emergency timer relay ETMB, back contact $h$ of relay PG, and front contact $f$ of relay PGST. This circuit is completed when fault conditions interrupt the operation of the apparatus during the programming cycle and relay ETMB releases prior to the release of relay PGST. Such action will be discussed hereinafter during the operational description of the system.

Figure 1:
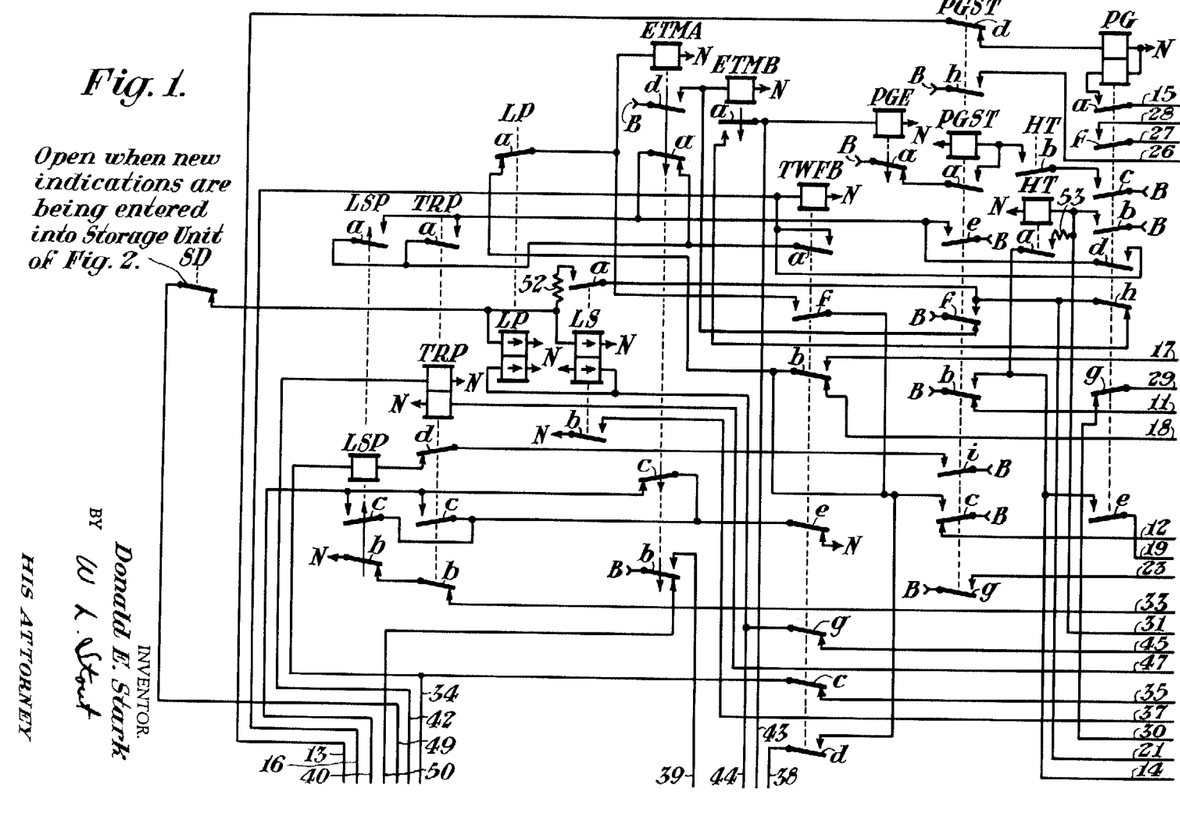
FIG. 1 shows diagrammatically the control coordinating and interlock circuit portion of the program control circuits embodying my invention.

The interlock stick relay LS and the interlock repeater relay LP, both shown in FIG. 1, are used for interlock purposes to coordinate the operation of the programming cycle with various remote control operations which may occur and also for interlocking between elements of the programming apparatus itself. The description of the operational circuits of these relays together with a fuller discussion of the use of emergency timer relays ETMA and ETMB may be better understood during, and will be included with, the description of the operation of the system. I shall now describe the operation of the programmer circuit arrangement of my invention in initiating and completing a typing program and the actuation of the typewriter during such programming.

I shall assume that the operator actuates push button PGPB to close its contacts $a$ to initiate a programming cycle. It is to be understood, of course, as previously discussed, that the initiation of programming cycles may be accomplished automatically with the time of initiation depending upon a preset time cycle. However, as specifically illustrated, the closing of contact $a$ of push button PGPB, with contact PGH within the electric typewriter closed indicating that manual typing is not in progress, energizes the upper winding of relay PG to initiate the programming cycle. The circuit includes, in addition to contact $a$ of push button PGPB and contact PGH, wire 13 and back contact $d$ of relay PGST which is closed to indicate that a programming cycle is not already in progress. The importance of contact PGH is emphasized since this permits the operator, particularly when automatic program initiation is provided, to use the typewriter for the manual entry of desired information and remarks upon the logging sheet without fear of having a programming cycle start with the typewriter in other than its at-rest position. If automatic initiation is used, some means must be provided, in any well known manner, for storing the start of the programming cycle in the event that the typewriter is being used for manual entry by the operator.

Relay PG, thus energized through its upper winding, picks up. The closing of front contact $b$ of relay PG energizes relay HT which also picks up. With front contacts $c$ and $b$ of relays PG and HT, respectively, closed, relay PGST is energized and picks up to start the actual programming action. Relay PGST completes a stick circuit over its own front contact $a$ which includes back contact $a$ of relay PGE. The closing of front contact $b$ of relay PGST completes a stick circuit for relay PG including its own lower winding and front contact $a$. This stick circuit also includes multiple paths through back contacts $a$, in series, of all horizontal coils of each crossbar switch, the various series circuits being connected in parallel over wire 14 to terminal B at front contact $b$ of relay PGST.

A stick circuit for relay HT is also completed at this time including its own front contact $a$ and front contact $b$ of relay PGST. Relay HT may also be used for purposes which are not here shown. Such uses would include the holding of a clock mechanism to prevent the changing of the indicated time during the typing program so that the time entry usually made in such log sheets will indicate the actual time at which the data was pertinent. In the manner explained previously, relay HT may be released at a selected point during the programming cycle when it has served its assigned purposes.

With front contacts $e$ and $d$ of relays PGST and PG, respectively, closed, relay TWFB is energized at this time and picks up. Relay ETMA is also energized, the circuit including front contact $c$ of relay PGST and back contact $a$ of relay LP, with this latter back contact shortly bypassed by front contact $f$ of relay TWFB. With front contact $b$ of relay PGST and front contact $e$ of relay PG closed, relay VCP is energized at this time, the circuit further including wire 19 and the upper winding of relay VCP. This latter relay completes a stick circuit over its own front contact $a$ which presently includes back contact $a$ of vertical coil 1V1, back contact $c$ of coil 1V2, wires 20 and 14, and front contact $b$ of relay PGST. Also, relay OHO are driven reverse, if not already so positioned, current flowing through their lower windings in a direction opposite to the arrow over circuits including front contact *h* of relay PGST, wire 26, back contact *b* of relay YH, and back contacts *b* in series, of coils H1 and H2 of the associated crossbar switch. Relay OVO is likewise driven reverse, also if not already so positioned, by a circuit including front contact *g* of relay PGST, wire 23, reverse contact *b* of relay YV, wire 32, back contacts *b* in series, of all odd-numbered vertical coils of the crossbar switches, the lower winding of relay OVO, wire 33, and back contacts *b*, in series, of relays TRP and LSP. This action guarantees that relays OHO and relay OVO are in the proper position at the start of the programming cycle.

With front contact *c* of relay PGST closed, the closing of front contact *b* of relay TWFB completes the circuit for energizing the upper winding of relay YV, the circuit further including wire 17 and reverse contact *a* of relay ZV. This causes relay YV to operate its contacts to their normal positions. When relay VCP picks up, closing its front contact *b*, the upper winding of relay YH is energized, the circuit further including front contact *f* of relay PGST, wires 21 and 24, and back contact *a* of relay ZH. The closing of front contact *b* of relay YH completes a circuit for energizing the first horizontal coil of each crossbar switch, energy being supplied over front contact *h* of relay PGST, and the circuit further including front contact *f* of relay PG. Each H1 coil closes its front contact *a* completing a stick circuit including back contacts *a* of the remaining horizontal coils for that crossbar switch, wire 14, and front contact *b* of relay PGST. The closing of front contact *b* of relay YH likewise energizes the upper winding of each relay OHO, the circuit including back contacts *b*, in series, of coils H3 and H4 of the associated crossbar switch. With the circuit through the lower winding open, each OHO relay is thus driven to its normal position at this time, indicating that only the H1 coil of the associated switch is energized.

The opening of back contact *a* of each horizontal coil H1 of the crossbar switches interrupts all of the multiple paths in the stick circuit for relay PG which immediately releases, its energizing circuit already being open at back contact *d* of relay PGST. The opening of front contact *d* of relay PG deenergizes relay TWFB which likewise releases at this time to close its back contact *b*. This latter action completes the circuit for energizing the upper winding of relay ZV, the circuit further including normal contact *a* of relay YV which was previously closed. Relay ZV is energized in the proper manner to close its normal contacts at this time.

When relay PG releases, closing its back contact *g*, the circuit is completed for energizing vertical coil 1V1 of the No. 1 crossbar switch. This circuit checks that the positions of relay YH and relays OHO1 to OHO4, inclusive, are in agreement. This agreement is indicated by the closing of normal contacts *a*, in series, of all relays OHO and the closing of front contact *c* of relay YH. The circuit for coil 1V1 includes front contact *g* of relay PGST, wire 23, normal contact *b* of relay YV, the agreement circuit just discussed, wire 29, back contact *g* of relay PG, wire 30, back contact *a* of relay VCBP, and coil 1V1. When coil 1V1 picks up, the closing of its front contact *a* completes the stick circuit which includes back contact *c* of coil 1V2 and front contact *b* of relay PGST. The opening of back contact *a* of coil 1V1 interrupts the stick circuit for relay VCP which releases at this time.

Back contact *b* of relay VCP now closes to energize relay ZH through the circuit including front contact *f* of relay PGST, wire 21, and front contact *a* of relay YH. This circuit also provides a stick circuit for relay YH through its lower winding. Another path branches at back contact *b* of relay VCP through the winding of relay VCBP and this relay likewise picks up. The opening of back contact *a* of relay VCBP interrupts the energizing circuit for coil 1V1. Since relay VCP is not reenergized until the end of the vertical coil chain sequence, relay VCBP, at its back contact *a*, holds open the energizing circuit for coil 1V1 during the remainder of the vertical chain sequence. This prevents the incorrect reenergization of coil 1V1 through the horizontal chain agreement circuits which would otherwise provide a path in multiple with the circuits for the succeeding odd-numbered vertical coils. The energization of coil 1V1 and the release of relay VCP terminate the starting cycle of the typing program. With horizontal coil H1 of each crossbar switch and vertical coil 1V1 energized, the first set of crosspoint contacts is closed in preparation for the first typing cycle.

As the first typing cycle starts, relay OVO is driven to its normal position by the energization of its upper winding. The circuit is completed at back contact *c* of relay VCP which closes just prior to this time and further includes back contacts *b*, in series, of the even-numbered vertical coils, normal contact *b* of relay YV, and front contact *g* of relay PGST to provide the connection to terminal B. The connection to terminal N is provided over wire 33 and back contacts *b*, in series, of relays TRP and LSP. The operation of relay OVO to its normal position, and thus into agreement with the position of relay YV, checks the energization of coil 1V1 which is indicated by the release of relay VCP.

I shall assume, for purposes of this description, that this first typing cycle is one in which a fixed format is entered into the electric typewriter and that, for purposes of information recording in the illustrated system, the first typewriter action desired is a spacing movement, so that terminal SP must be connected to terminal B of the local source. With coils 1H1 and 1V1 energized, a circuit is completed at this time through the crossbar switch contact banks, particularly, from terminal B at terminal CB6 over contact *f* of crosspoint contact set 1–H1–V1, terminal ITRP of the contact banks, wire 44, and the lower windings, in multiple, of relays LP and LS to terminal N. It is obvious, however, that the flow of current through the lower winding of relay LS is in a direction opposite to the arrow so that this biased relay is not properly energized to pick up its contacts. Relay LP, however, is properly energized and closes its front contacts at this time. The opening of back contact *a* of relay LP deenergizes relay ETMA since front contact *f* of relay TWFB is already open. However, this slow release relay retains its front contacts closed during this action. At the same time, a circuit branches from wire 44 over back contact *g* of relay TWFB, wire 45, normal contact *d* of relay YV, wire 46, normal contact *b* of relay OVO, wire 47, and the lower winding of relay TRP to terminal N. Relay TRP, thus energized, picks up. It is to be noted that this circuit checks the agreement in the positions of relays YV and OVO. If the step in the programming action had been such that relays YV and OVO were in agreement in their reverse positions, the circuit for relay TRP would have included reverse contact *d* of relay YV, wire 48, and reverse contact *b* of relay OVO.

The circuits are now completed for energizing the proper solenoid in the electric typewriter to, in the presently assumed operations, space the typewriter carriage to its next typing position. Terminal B is connected to terminal SP of the electric typewriter over a circuit including front contact *b* of relay ETMA, this contact remaining closed although the relay is deenergized, wire 39, terminal CB5 of the contact banks, contact *e* of crosspoint set 1–H1–V1 and terminal CSP of the contact banks. The connection to negative battery from the common terminal of the typewriter is completed over wire 40, front contact *c* of relay TRP, and back contact *e* of relay TWFB to terminal N. The typewriter carriage is thus spaced to the next position through the operation of the selected typewriter solenoid.

A short time after the typewriter solenoid is energized, the feedback pulse is originated in the typewriter to energize relay TWFB. This action is conventionally illustrated in the present circuits by the normally open contact FB shown within the electric typewriter block diagram and conventionally designated by dotted line 51 as controlled by any energized solenoid to be closed a selected time interval after the solenoid is energized. In one form of electric typewriter in common use, this feedback pulse is originated about 40 milliseconds after any typewriter solenoid is energized and is terminated about 45 milliseconds thereafter. However, the system of my invention is not dependent upon such timing and these time intervals are mentioned herein only to give a specific example of such operation. The feedback pulse is carried over wire 16 to the winding of relay TWFB which picks up at this time. The opening of back contact $g$ of relay TWFB deenergizes relay TRP which shortly releases so that front contact $a$ of relay TWFB opens to interrupt the stick circuit for relay TWFB prior to the termination of the feedback pulse from the typewriter. The release of relay TRP to open its front contact $c$ further interrupts the connection from the tyepwriter solenoids to terminal N which was interrupted originally at back contact $e$ of relay TWFB. This connection to terminal N must be interrupted by relay TRP prior to the release of relay TWFB at the end of the feedback pulse in order that the typewriter solenoids will remain deenergized after the spacing action of this particular cycle is completed.

The closing of front contact $b$ of relay TWFB completes the circuit over wire 17 and normal contact $a$ of relay ZV for energizing the lower winding of relay YV. The flow of current being opposite to the arrow, relay YV operates to close its reverse contacts at this time. The closing of reverse contact $b$ of relay YV energizes vertical coil 1V2 over front contact $b$ of vertical coil 1V1. Coil 1V2 picks up and prepares a stick circuit over its own front contact $a$ and back contacts $a$ of the succeeding vertical coils which is completed when coil 1V1, which is deenergized by the opening of back contact $c$ of coil 1V2, releases to close its back contact $c$. When relay TWFB releases after the termination of the feedback pulse, the closing of its back contact $b$ completes the circuit, which includes reverse contact $a$ of relay YV, for energizing the lower winding of relay ZV. Again, the flow of current through this lower winding is in the direction opposite the arrow and relay ZV likewise operates its contacts to close in the reverse position. The apparatus is now positioned for the second typing cycle, the first cycle having accomplished the purpose of spacing the typewriter carriage to the desired recording position.

I shall assume that the indication storage contacts AP1K, AP2K, AP4K and AP8K shown in the lower part of FIG. 2 are assigned to this next typing cycle. It is further assumed that the numeral 7 is stored by these storage contacts for recording by the typewriter at the proper time. This indication is stored by the closing of contacts AP1K, AP2K and AP4K, the weighted numerical value of these contacts adding to the numeral 7, as is obvious.

When back contact $b$ of vertical coil 1V1 closes, the circuit is completed for energizing the lower winding of relay OVO. This circuit extends from terminal B at front contact $g$ of relay PGST over wire 23, reverse contact $b$ of relay YV, wire 32, back contacts $b$, in series, of the odd-numbered vertical coils of all the crossbar switches, the lower winding of relay OVO in the direction opposite the arrow, wire 33, and back contacts $b$, in series, of relays TRP and LSP to terminal N. Relay OVO operates its contacts to close in their reverse positions, thus checking by its agreement with the position of relay YV that the preceding vertical coil has released and that only vertical coil 1V2 is energized at this time.

With crosspoint contact set 1–H1–V2 picked up, energy is supplied from terminal CB6 of the contact banks over contact $f$ of this crosspoint set, terminal IL of the contact banks, wire 49, a normally closed contact SD which is open only when the remote control system is active to receive a new indication to store in contacts AP ... K, and the upper windings, in multiple, of relays LP and LS. The flow of current in these relay windings is in the proper direction to cause these biased relays to pick up their contacts, thus closing front contacts. It is to be noted that relay LP was energized during the preceding typing cycle. The action of the crossbar switches in closing successive crosspoint contact sets is sufficiently rapid that relay LP does not release its contacts during the interval between the operation of the first and second contact sets. The closing of front contact $a$ of relay LS at this time completes a stick circuit through the upper windings of both relays which is already prepared at front contact $f$ of relay PGST and includes a resistor 52. These two relays will thus remain energized at a reduced level with front contacts closed until forced to release by some other later action.

This completes the circuit arrangements for energizing the proper relays TR to momentarily register the information stored in contacts AP ... K. The lower windings of relays TR1, TR2 and TR4 are connected to terminal B at contacts AP1K, AP2K and AP4K, respectively, over contacts $a$, $b$ and $c$ of crosspoint contact set 1–H–V2, which are closed at this time, and terminals CB1, CB2 and CB3 of the crossbar switch contact banks. The left-hand terminals of the lower windings of relays TR are connected in multiple and thence over wire 34, back contact $c$ of relay TWFB, which is now closed, wire 35, reverse contact $c$ of relay YV, wire 36, reverse contact $a$ of relay OVO, wire 37, and front contact $b$ of relay LS to terminal N. Relays TR1, TR2 and TR4 are thus energized with the flow of current in the proper direction to cause these relays to operate their contacts to close in the normal position.

The circuit is now completed for energizing the upper winding of relay TRP. It is to be noted that no circuit exists for the lower winding of this relay under these conditions since there are no connections through crosspoint contact set 1–H1–V2 to terminal ITRP of the contact banks. The circuit for relay TRP at this time extends from terminal B at front contact $b$ of relay ETMA over wire 39, terminal CB5 of the contact banks, contact $e$ of crosspoint set 1–H1–V2, terminal CTR of the contact banks, normal contact $a$ of relay TR4 or normal contact $a$ of relay TR2 and reverse contact $b$ of relay TR8, wire 42, and the upper winding of relay TRP to terminal N. Relay TRP thus picks up to close at its front contact $c$ in the connection from the common terminal of the electric typewriter to terminal N, this connection having been previously traced.

It will be remembered, as previously described, that if the numeral 0 had been registered in the translator relay bank so that all of the relays remained in their reverse position, relay TRP would not be energized at this time. However, under these conditions, relay LSP will be energized for a sufficient period, due to back contact $d$ of relay TRP remaining closed, to pick up at the end of its slow pickup period and close its front contact $c$ to complete the circuit arrangement to terminal N for the electric typewriter. With the assumed indication and the registry of the numeral 7 in the TR relay bank, back contact $d$ of relay TRP opens prior to the expiration of the slow pickup period of relay LSP which thus remains released.

With front contact $c$ of relay TRP closed to provide a connection to terminal N for the typewriter, the printing of the numeral 7 is accomplished at this time. The connection to terminal 7 to energize the solenoid extends from terminal CTR of the contact banks, which is connected to terminal B as previously described, over reverse contact $a$ of relay TR8 and normal contacts $c$, in series, of relays TR4, TR1 and TR2 to terminal 7. A short time after the solenoid is energized and the numeral typed, contact FB closes to provide a feedback pulse, as previously described, to energize relay TWFB which again picks up. At this time, the opening of back contact $c$ of relay TWFB deenergizes the lower windings of relays TR while the closing of front contact *d* of relay TWFB completes the circuit for energizing the upper windings of these relays, the current flowing in the direction opposite to the arrow to return these relays to their reverse position. This, of course, deenergizes relay TRP which shortly releases.

The closing of front contact *b* of relay TWFB completes the circuit for energizing relay YV through its upper winding with the current flow being in the direction to cause the relay to close its contacts in their normal position, the action being similar to that described for the initial cycle. The closing of normal contact *b* of relay YV completes the circuit for energizing vertical coil 1V3, the circuit at this time extending from terminal B at front contact *g* of relay PGST over wire 23, normal contact *b* of relay YV, wire 22, front contact *b* of coil 1V2, and vertical coil 1V3 to terminal N. This steps the vertical chain to the next position, the opening of back contact *a* of coil 1V3 deenergizing coil 1V2 to cause its release. The closing of front contact *a* of coil 1V3 completes a stick circuit for this coil which is similar to that previously traced for the preceding coil. When relay TWFB releases at the end of the feedback pulse, the system is prepared for the next or third typing cycle.

It is here assumed that the third typing cycle is of a fixed format nature during which the numeral 0 will be typed to complete the indication started by the numeral 7 typed during the preceding cycle. Such recording action is common in control installations since frequently the last figure of the quantity is not considered to be critical and no data code is transmitted from the station. The log record is then completed by typing the numeral 0 to provide sufficient digit spaces for complete understanding. The typing of the numeral 0 under these conditions is not actuated through contacts of the translator relays but is actuated over circuits completed in the crossbar switch contact banks in a manner similar to that desbribed for the first cycle when the typewriter carriage was spaced only. To actuate the proper solenoid under these conditions, terminal B must be connected to terminal 0 of the electric typewriter. Also, as for any character, the connection from the common terminal of the typewriter must be completed to terminal N.

When relay TWFB releases at the end of the feedback pulse in the preceding typing cycle, the closing of its back contact *b* completes the circuit for energizing the upper winding of relay ZV over normal contact *a* of relay YV. Relay ZV is thus energized to operate its contacts to close in their normal position. A circuit is also completed for energizing the upper winding of relay OVO to indicate the agreement in the vertical coil chain with the position of relay YV. The circuit for relay OVO includes normal contact *b* of relay YV, back contacts *b*, in series, of the even-numbered vertical coils of all crossbar switches, back contact *c* of relay VCP, the upper winding of relay OVO, and back contacts *b* of relays TRP and LSP. Relay OVO is thus energized and operates its contacts to close in their normal position, this being in agreement with the position occupied by the contacts of relay YV.

When vertical coil 1V3 is energized and picks up, crosspoint contact set 1–H1–V3 is closed. This completes a circuit for the lower winding of relays LP and LS, which may be traced from terminal B at terminal CB6 of the contact banks over contact *f* of contact set 1–H1–V3, bank terminal ITRP, wire 44 and the lower windings, in multiple, of relays LS and LP to terminal N. Relay LP remains picked up by this energization since the flow of current is in the direction of the arrow through its lower winding. However, the flow of current in relay LS in the direction opposite to the arrow in the lower winding and the energization of this winding overcomes the stick circuit energy in the upper winding which is at a reduced level because of resistor 52. Relay LS, being a biased relay, is thus forced to release and opens its front contacts. This interrupts the stick circuit for relays LS and LP but the latter relay, of course, is properly energized to remain picked up. The opening of front contact *b* of relay LS interrupts the connection to terminal N for translator relays TR and also for relay LSP so that these relays cannot operate at the present time. A circuit for relay TRP branches from wire 44 over back contact *g* of relay TWFB and includes normal contacts *d* and *b* of relays YV and OVO, respectively, which are in agreement, and the lower winding of TRP. This relay, thus energized, picks up to again complete, at its front contact *c*, the connection to terminal N for the electric typewriter solenoids.

Terminal B is connected to terminal 0 of the electric typewriter at this time by a circuit including front contact *b* of relay ETMA, wire 39, terminal CB5 of the contact banks, contact *e* of crosspoint set 1–H1–V3 and terminal CO of the contact banks. The proper typewriter solenoid is thus energized to actuate the printing of the numeral 0 by the typewriter. The typing action, of course, is shortly followed by the energization of relay TWFB by the feedback pulse. The pickup of relay TWFB, as usual, results in the deenergization of relay TRP and the typewriter solenoids. The following release of relay TRP further interrupts the connection to terminal N from the solenoids.

The closing of front contact *b* of relay TWFB energizes the lower winding of relay YV in a manner to cause this relay to close its reverse contacts. The closing of reverse contact *b* of relay YV causes the energization of vertical coil 1V4 over front contact *b* of coil 1V3 in the manner previously described. Coil 1V4 picks up its contacts, deenergizing coil 1V3 and completing its own stick circuit in the manner similar to that previously described for preceding coils. When relay TWFB releases at the end of the feedback pulse and closes back contact *b*, relay ZV is energized through its lower winding and likewise operates at this time to close its reverse contact to correspond with the position of relay YV. This completes the third typing cycle and prepares the apparatus for the next typing cycle.

The typing cycles continue in sequence as each vertical coil of the crossbar switches picks up in series cascade until coil 4V4 is energized at the beginning of the sixteenth typing cycle. It is to be noted that the stick circuit for coil 4V4 includes, in the vertical coil chain, only its own front contact *a* and back contact *c* of coil 1V1. During these first sixteen steps or typing cycles, as illustrated specifically by the detailed description of the first three, a fixed format may be typed during any cycle or the received information as translated through relays TR may be used to energize the typewriter solenoids to record the data from the field stations.

When relay TWFB is energized and picks up during the sixteenth typing cycle, the closing of its front contact *b* completes the circuit over reverse contact *a* of relay ZV, to energize relay YV, which operates to close its contacts in the normal position. At this time, relay VCP is energized through its lower winding. The circuit includes normal contact *b* of relay YV and back contacts *b*, in series, of all even-numbered vertical coils except coil 4V4, whose front contact *b* is closed to complete the circuit through the lower winding of relay VCP to terminal N. Relay VCP thus picks up at this time and completes its usual stick circuit.

The closing of front contact *b* of relay VCP completes a circuit for energizing the lower winding of relay ZH over its own front contact *a* to hold this relay energized. However, the opening of back contact *b* of relay VCP deenergizes relay YH by interrupting its stick circuit and this latter relay releases. This causes horizontal coils H3 to be energized, a typical circuit including front contact *h* of relay PGST, wire 26, back contact *b* of relay YH, front contact *b* of coil 1H1, and coil 1H3 to terminal N. Coil 1H3 picks up, closing its front contact *a* to complete its own stick circuit and interrupting, at its back contact

*a*, the stick circuit for coil 1H1 which then releases. Similar action occurs for the horizontal coils of the other crossbar switches. This completes the circuits for the lower windings of relays OHO over back contacts *b* of associated coils H1 and H2 and back contact *b* of relay YH. Each relay OHO, thus energized, operates its contacts to their reverse position.

The opening of back contact *b* of relay VCP also deenergizes relay VCBP which releases at this time. The circuit is now complete for reenergizing vertical coil 1V1 and, at this time, includes front contact *g* of relay PGST, normal contact *b* of relay YV, reverse contact *a* of relay OHO1, reverse contacts *b*, in series, of relays OHO2, OHO3 and OHO4, back contact *c* of relay YH to indicate agreement in the horizontal chain, back contact *g* of relay PG and back contact *a* of relay VCBP. Coil 1V1 picks up to complete its stick circuit which includes back contact *c* of coil 1V2. The opening of back contact *c* of coil 1V1 interrupts the stick circuit for coil 4V4 which immediately releases. This interrupts, at front contact *b* of coil 4V4, the energizing circuit for relay VCP which, since its stick circuit is now open at back contact *a* of coil 1V1, shortly releases. The system is now prepared to repeat the cycle through the vertical coil chain in the manner previously described when horizontal coils H1 of the four crossbar switches were energized.

Repeat cycles through the vertical coil chain continue as each successive set of horizontal coils is energized at the end of the preceding vertical chain cycle. This action may be halted and the program ended on any particular step in the programming action. However, for purposes of specific example, I have assumed that the full capacity of the four crossbar switches illustrated is required and that the program is not ended until the sixty-fourth step. In other words, the circuit for energizing relay PGE is completed when crosspoint contact set 4–H4–V4 is closed at the end of the fourth cycle of operation of the vertical coil chain. The circuit for relay PGE at this time may be traced from terminal B at terminal CB6 of the contact banks over contact *f* of crosspoint contact set 4–H4–V4, terminal ED of the banks, wire 43 and the winding of relay PGE to terminal N.

The opening of back contact *a* of relay PGE deenergizes relay PGST by interrupting its stick circuit. Relay PGST releases at this time to open its front contacts. The opening of front contact *f* of relay PGST interrupts the circuits for relays ZH and YH which release if not already in this position. The opening of front contact *b* of relay PGST interrupts all stick circuits for the horizontal and vertical coils of the crossbar switches and any coils which are energized at this time will thus be released and the crossbar switches reset to their normal at-rest conditions. The closing of back contacts *b* and *c* of relay PGST energizes the lower windings of relays YV and ZV, respectively, causing both of these relays to operate their contacts to close in the reverse positions, if not already occupying that position. The opening of front contact *c* of relay PGST deenergizes relay ETMA which, however, retains its front contacts closed until the expiration of its slow release period. Relay ETMB, however, remains energized over back contact *f* of relay PGST when relay ETMA releases. Relays OHO and also relay OVO will be deenergized at this time but, since these are magnetic stick type relays, their contacts will remain in the position to which they were last operated. For the specific showing of the present case, these relays are in their reverse position during the last step of the crossbar switch action and thus their contacts remain in the reverse position in which they are shown in the drawings. The opening of all crosspoint contacts of the crossbar switches assures the release of relays LP, LS and TRP.

When relay ETMA releases, the closing of its back contacts *b* and *c* completes a circuit directly connected to terminal X of the electric typewriter. The circuit is traced from terminal B at back contact *b* of relay ETMA over wire 50 to terminal X of the typewriter and from the common terminal of the typewriter over wire 40 and back contacts *c* and *e* of relays ETMA and TWFB, respectively, to terminal N. This circuit will cause the typewriter to print to the end of the line if not already at that location but this action is not important in the operation of the system. However, if this is not desired, front contacts of relay PGST may be used to interrupt the power supply to the typewriter motor and mechanism. With the release of relay ETMA, all the apparatus has returned to its at-rest condition in which it is shown in the drawings. The system is thus reset, prepared to initiate a new programming cycle.

Relays ETMA and ETMB also serve a purpose during system operation in case fault conditions occur which interrupt the regular progress of the programming cycle and necessitate a resetting action. It has already been explained that the release of relay ETMA energizes terminal X of electric typewriter to cause the typewriter to print to the end of the existing line. In normal operation, relay ETMA becomes deenergized for sufficient period to release only if relay TWFB does not receive the feedback pulses from the typewriter to close its front contact *f* periodically to reenergize relay ETMA. This may occur as a result of a fault within the typewriter mechanism or as a result of the failure of the crossbar switches to advance their coil chains and supply energy to the typewriter solenoids for a new typing cycle. However, if the typing program is delayed by reception of new indications over the control system from a station, which is indicated by the opening of a contact such as SD, relay LP will release to close its back contact *a* and bypass front contact *f* of relay TWFB and thus hold relay ETMA energized until the typing program is resumed. Back contact *a* of relay LP is normally used only during the initial period of the programming cycle to provide energy to relay ETMA prior to the initial energization of relay TWFB, since relay LP, it will be remembered, is normally held energized during the programming cycle.

The opening of front contact *b* of relay ETMA, if it releases during the programming operation, interrupts the connection from terminal B to the crosspoint contacts by which the energy is further supplied to the translation matrix formed by contacts of the translator relays. This, of course, would halt the supply of energy to the typewriter solenoids for printing the selected characters from the indicator storage units. If relay ETMA does release during the typing program, it is generally because of some fault condition which prevents the typewriter from providing the feedback pulses which actuate the chain stepping actions. When front contact *d* of relay ETMA opens, relay ETMB is likewise deenergized, since back contact *f* of relay PGST is open at this time, and eventually releases. Under these conditions, the closing of back contact *a* of relay ETMB completes an auxiliary circuit for relay PGE which further includes front contact *f* of relay PGST and back contact *h* of relay PG. It should be noted that relay PGST is retained energized over back contact *a* of relay PGE so that this circuit for relay PGE is available in the event of a continued fault condition. The energization of relay PGE under these conditions will likewise halt the programming operation and cause a resetting of the apparatus to its at-rest condition. This early termination of the programming indicates that a fault condition exists which must be removed by regular maintenance operations.

It is apparent from the preceding description that the programming control circuits of my invention provide an arrangement whereby an orderly and sequential recording of information supplied from all the remote stations over the remote control system may be entered into a permanent record to indicate the operation and condition of the material transportation system at a particular time. This programming arrangement has been designed in such a way as to provide a flexible unit which can be expanded as desired by additional crossbar switches to provide additional steps in the read-out process. No change in the principles of operation of the arrangement will result from the addition of crossbar switches to the chain action or from the substitution of larger switches having a greater number of horizontal and vertical coils in place of the smaller switches specifically shown. There is no change is system operation whether one larger switch is provided or several smaller type switches are connected in sequence. Furthermore, system operation is automatic in nature once it has been initiated, and even this may be automatically accomplished, and requires no supervision on the part of the system operator unless fault conditions occur. This frees the system operator for his normal duties of controlling the movement of materials throughout the system by the remote control system. The permanent record of the system operation is thus made available for later study and for such recording and accounting purposes as may be required to complete the delivery of the materials being transported.

Although I have herein shown and described but one form of programming control circuits embodying the features of my invention, it is to be understood that various changes and modifications may be made therein within the scope of the appended claims without departing from the spirit and scope of my invention.

Having thus described my invention, what I claim is:

1. Programming control circuits for data recording including in combination, a crossbar switch arrangement having a plurality of horizontal and vertical coils and a plurality of crosspoint contact sets, means connecting said horizontal and said vertical coils to operate in counting chain sequence to momentarily close in sequence said crosspoint contact sets; at least one set of indication storage contacts for storing by the closed combination thereof a data quantity, a recording device responsive to a data code input to produce a permanent record of that data and a stepping pulse output for each data quantity recorded, a stepping relay means operable in response to stepping pulses emitted from said recording device, a first energizing circuit for said horizontal and vertical coils including contacts controlled by the operation of said stepping relay means to advance the chain sequence one step for each stepping pulse, a translator relay bank with one relay for each contact of said storage contact set, at least one second energizing circuit for said translator relay bank comprising means for connecting said indication storage contacts when said secondset of crosspoints contacts to energize said translator relay bank in a combination corresponding to the closed combination of said storage contacts when said second set of crosspoint contacts is closed to momentarily register the stored data quantity, and an input circuit arrangement for said recording device including another contact of said selected set of crosspoint contacts connected to the contacts of said translator relays to translate the registered data quantity into a proper code input for said recording device to record that data quantity.

2. A programming control arrangement for data recording comprising in combination, crossbar switch apparatus including horizontal and vertical coil chains and a plurality of crosspoint contact sets, means connecting said horizontal coils and said vertical coils to operate in counting chain sequence to momentarily close in sequence said crosspoint contact sets, a plurality of indication storage contact sets each storing by the closed combination thereof a particular data quantity to be recorded, a recording device operable in response to the reception of a data code to record that data and to transmit a stepping pulse during the recording action, a stepping relay means controlled by the stepping pulses and having connections for advancing the counting action of said crossbar switch coils one step during each stepping pulse, a translator relay bank comprising one relay for each contact in one storage contact set, an energizing circuit network for the translator relays corresponding to each storage contact set comprising means for connecting the corresponding contacts of each storage contact set through a respective selected set of said crosspoint contacts to energize said translator relays in a combination corresponding to the closed combination of that corresponding set of storage contacts when said respective set of said crosspoint contacts is closed to momentarily register that particular data quantity stored by the storage contacts, and an input circuit network connected to said recording device to actuate the recording of each data quantity and including another crosspoint contact of said selected set connected to the contacts of said translator relays to translate the registered data quantity into a proper code input for said recording device in accordance with the energized combination of said translator relays.

3. A programming control arrangement for data recording comprising in combination, crossbar switch apparatus including horizontal and vertical coil chains and a plurality of crosspoint contact sets, means connecting said horizontal coil and said vertical coils to operate in counting chain sequence to momentarily close in sequence said crosspoint contact sets, a plurality of indication storage contact sets each storing by the closed combination thereof a particular data quantity to be recorded, a recording device operable in response to the reception of a data code to record that data quantity and to transmit a stepping pulse during the recording action, a stepping relay means having connections for responding to the stepping pulses and for advancing the counting action of said cross-bar switch coils one step during each stepping pulse, and an input circuit network comprising first means for connecting each of said storage contact sets through a respective selected set of said crosspoint contacts to second means connected to said recording device for actuating the recording of the data quantity represented by the closed combination of each of said storage contacts when its respective selected set of crosspoint contacts is closed.

4. Programming control circuits for data recording including in combination, a crossbar switch arrangement having a plurality of horizontal and vertical coils and a plurality of crosspoint contact sets, means connecting said horizontal and said vertical coils to operate in counting chain sequence to momentarily close in sequence said crosspoint contact sets; at least one set of indication storage contacts for storing by the closed combination thereof a data quantity, a recording device responsive to a data code input to produce a permanent record of that data and a stepping pulse output for each data quantity recorded, a stepping relay means operable in response to stepping pulses emitted from said recording device, an energizing circuit for said horizontal and vertical coils including contacts controlled by the oeration of said stepping relay means to advance the chain sequence one step for each stepping pulse, and an input circuit network comprising first means for connecting said storage contact set through a selected set of said crosspoint contacts to second means connected to said recording device for actuating the recording of the data quantity represented by the closed combination of said storage contacts when said selected set of crosspoint contacts is closed.

References Cited in the file of this patent

UNITED STATES PATENTS

| | | |
|---|---|---|
| 2,199,824 | Kinkead | May 7, 1940 |
| 2,444,202 | McAlpine | June 29, 1948 |
| 2,682,652 | Grace | June 29, 1954 |
| 2,701,748 | Anderson | Feb. 8, 1955 |
| 2,905,520 | Anderson | Sept. 22, 1959 |

FOREIGN PATENTS

| | | |
|---|---|---|
| 754,118 | Great Britain | Aug. 1, 1956 |

UNITED STATES PATENT OFFICE
CERTIFICATE OF CORRECTION

Patent No. 3,096,138            July 2, 1963

Donald E. Stark

It is hereby certified that error appears in the above numbered patent requiring correction and that the said Letters Patent should read as corrected below.

Column 25, line 51, for "when said secondset" read -- through a selected set --.

Signed and sealed this 14th day of January 1964.

(SEAL)
Attest:

ERNEST W. SWIDER

Attesting Officer

EDWIN L. REYNOLDS

Acting Commissioner of Patents